Oct. 9, 1928.

W. F. MacGREGOR 1,686,828

COMBINATION HARVESTER THRASHER

Filed March 21, 1925

INVENTOR.
WALLACE F. MacGREGOR,

BY James A. Walsh

ATTORNEY.

Patented Oct. 9, 1928.

1,686,828

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

COMBINATION HARVESTER-THRASHER.

Application filed March 21, 1925. Serial No. 17,385.

My invention relates to improvements in combination harvester-thrashers, and particularly to means for connecting said elements in a manner whereby they may be compactly folded to reduce the width of the machine as a whole for transportation and storage purposes.

Figure 1:
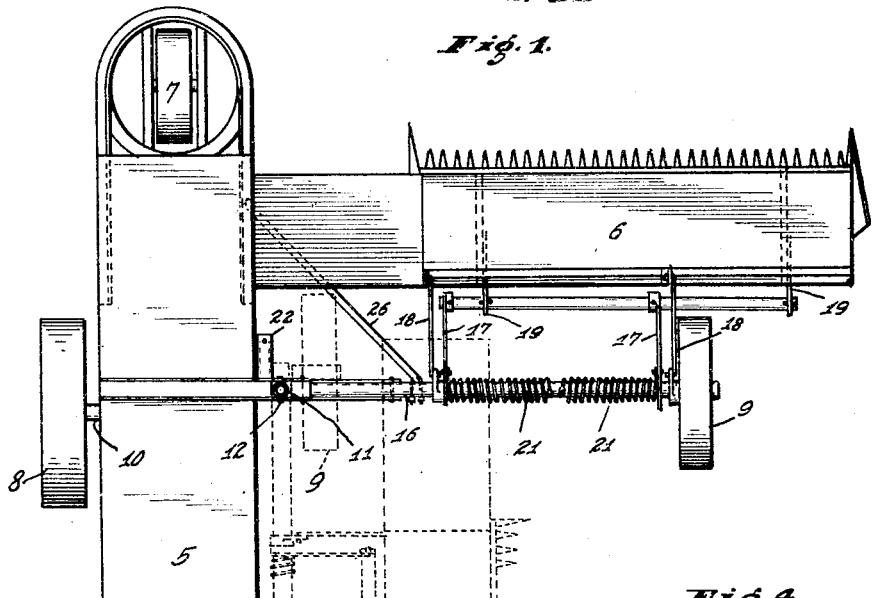
Figure 2:
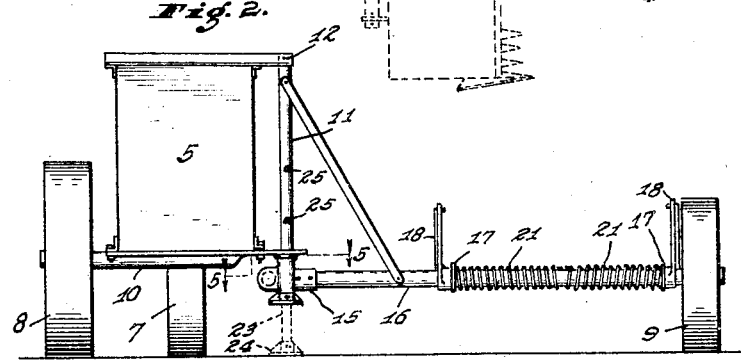
Figure 3:
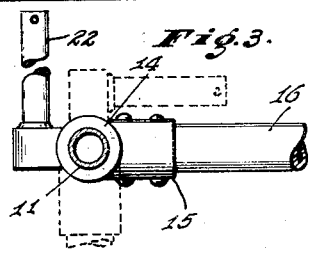

In the accompaning drawing, forming part hereof, Figure 1 is a plan of a combination harvester-thrasher embodying my improvements, certain equipment and details of construction being omitted for purposes of clearness; Fig. 2 an end elevation; Fig. 3 an enlarged detail of the hinge mechanism which I employ taken on the dotted line 5—5 in Fig. 2; and Fig. 4 a plan illustrating a modified arrangement of the stub-axle which I may employ.

In said drawing the portions marked 5 indicate the thrasher, 6 the harvester, 7 and 8 the carrying wheels for the thrasher, and 9 the interchangeable ground-wheel for the harvester and thrasher. As shown, the thrasher wheel 8 may be supported upon a stub axle, 10. Upon the side of the thrasher opposite to wheel 8 I mount a hinge member 11, and at its lower end said hinge is secured to a coupling, 14, preferably having a socket member, 15, extending laterally from the thrasher for supporting the axle, 16, which sustains the harvester frame, 17, 18, to which latter the forwardly extending arms, 19, are secured, and upon which the carrier and other mechanisms of the harvester are mounted.

For readily raising and lowering said harvester I provide coiled springs, 21, about axle 16, which at one end are anchored to said axle and at their opposite ends are connected to the harvester frame, so as to balance the weight thereof, and these springs are so tensioned that with ordinary or simple controlling mechanism (not shown) connected to the thrasher and harvester the latter may be adjusted and maintained and guided in proper relation to the crop to be cut.

Figure 4:
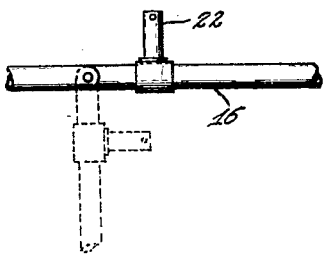

The coupling 14 carries a forwardly extending stub-axle, 22, as shown in Fig. 3, but it is obvious that such stub-axle may be secured directly to the main axle 16 and project laterally therefrom as indicated in Fig. 4, for a purpose to appear. The hinge member 11 and coupling 14 are hollow, and in which is inserted a supporting leg, 23, preferably provided with a foot, 24, which leg may be held in desired position by one or more pins, 25.

When it is desired to fold the harvester alongside the thrasher the leg 23 is lowered to the position shown by dotted lines in Fig. 2 and retained in such position by a pin, 25, which provides a stable support for the otherwise temporarily wheelless side of the thrasher. By removing the ordinary braces between the thrasher and harvester the latter by reason of its connection with the hinge member 11 through axle 16 can be swung closely alongside said thrasher as indicated by the dotted lines in Fig. 1. The stub axle 22 then assumes the position shown in dotted lines in Figs. 1 and 3, when the ground wheel 9 may be transferred from the end of axle 16 to said stub axle 22, as indicated by dotted lines in Fig. 1, the leg 23 meanwhile supporting the thrasher during the operations of folding the harvester and transferring said ground wheel, whereupon said leg may be telescoped into hinge member 11 and secured therein by the pins, as described, and the outer end of the axle supported by a chain, 27, or otherwise from the thrasher. It will thus be seen that I provide a hinge of simple character for folding the harvester close to the thrasher in a compact manner, and which is also adapted to be equipped with a wheel for supporting the thrasher in stationary and traveling positions in the manner described. While hinge member 11 is shown as of an elongated character and secured directly to the thrasher it will be understood that my improvement comprehends any suitable vertically arranged pintle for connecting axle 16 to the thrasher so that the harvester may be swung alongside thereof and the thrasher supported by a wheel mounted on a stub axle arranged as described or otherwise associated with an appropriate part of the combination machine for the purpose.

I claim as my invention:

1. In a machine of the class described, a thrasher, a harvester, a vertical hinge member connected to said thrasher, a coupling mounted on said member to turn horizontally in relation thereto, a stub-axle on said coupling, a support for said harvester connected to said coupling whereby the harvester may be swung horizontally and folded alongside said thrasher, and a wheel on said support adapted to be transferred therefrom to said stub-axle for sustaining said thrasher in traveling position when said harvester has been folded alongside thereof.

2. In a machine of the class described, a thrasher having a supporting-wheel, a harvester, means connecting said harvester and thrasher embodying a stub-axle and adapted to be swung horizontally in relation to said thrasher for folding the harvester alongside the thrasher, and an interchangeable wheel mounted on said connecting means and adapted to be transferred to said stub-axle for supporting said thrasher in traveling position when said harvester is folded alongside thereof.

3. In a machine of the class described, a thrasher, a harvester, means for flexibly connecting said elements whereby the harvester may be folded alongside the thrasher, a stub-axle associated with said connecting means, and a wheel on said harvester transferable to said stub-axle for portably supporting said thrasher.

4. In a machine of the class described, a thrasher, a harvester foldable alongside said thrasher, a hinge member connected to said thrasher, means supported by said member for sustaining said thrasher when said harvester is folded in relation thereto, and means connecting said harvester to said member whereby the harvester may be swung in a horizontal direction and folded alongside the thrasher.

5. In a machine of the class described, a thrasher, a harvester, a vertical hinge member secured to said thrasher, means connecting said harvester to said hinge member whereby the harvester may be swung in a horizontal direction and folded alongside said thrasher, and means adjustably connected to said member for supporting said thrasher as said harvester is being folded alongside thereof.

6. In a machine of the class described, a thrasher, a harvester, a hinge member mounted on said thrasher, means connected to said hinge member for supporting said thrasher, means connecting said harvester to said hinge member embodying a stub-axle, and a wheel mountable on said stub-axle for portably supporting said thrasher.

7. In a machine of the class described, a thrasher, a harvester adapted to be folded alongside said thrasher, a hinge member, means for supporting said thrasher in stationary position while said harvester is being folded, means for supporting said harvester embodying a stub-axle mounted on said hinge member for connecting said harvester to the latter, and a wheel mountable on said harvester and transferable to said stub-axle for portably supporting said thrasher as said harvester is being folded alongside thereof.

8. In a machine of the class described, a thrasher, a harvester hingedly connected to said thrasher whereby the harvester may be swung horizontally and folded in relation to the thrasher, means for supporting said thrasher as said harvester is being folded, wheel-supporting means adjacent said thrasher, and an interchangeable wheel on said harvester transferable to said wheel-supporting means for portably sustaining said thrasher as said harvester is folded alongside thereof.

9. In a machine of the class described, a thrasher, a harvester, means for supporting said harvester, means connecting said supporting means to said thrasher whereby the harvester may be swung horizontally and folded alongside the thrasher, means for supporting said thrasher in stationary position while said harvester is being folded, and means associated with said connecting means for supporting a wheel to portably sustain said thrasher when said harvester is folded in parallel relation thereto.

10. In a machine of the class described, a thrasher, a harvester foldable alongside said thrasher, a vertical hinge member connected to said thrasher, an adjustable support connected to said hinge member for sustaining said thrasher in stationary position as said harvester is folded in relation thereto, and means for connecting said harvester to said hinge member whereby the harvester may be adjusted in horizontal directions in relation to the thrasher.

In testimony whereof I affix my signature.
WALLACE F. MacGREGOR.